Patented Dec. 5, 1939

2,182,056

UNITED STATES PATENT OFFICE 2,182,056

PROCESS FOR MANUFACTURING SEBACIC ACID

Herman A. Bruson and Lloyd W. Covert, Philadelphia, Pa., assignors to Röhm & Haas Company, Philadelphia, Pa.

No Drawing. Application August 13, 1937, Serial No. 158,912

16 Claims. (Cl. 260—398)

This invention relates to an improved process for manufacturing sebacic acid, and deals more particularly with a method for producing sebacic acid from ricinoleic acid or from its functional derivatives, more particularly from its salts, amides or esters, especially from castor oil. It also deals with improvements in the process of recovering by-products of the reaction, notably octanol-2 and mixed fatty acids, as well as improvements in the recovery of the sebacic acid itself.

Sebacic acid, $HOOC—(CH_2)_8—COOH$, has heretofore been prepared by fusion of castor oil with caustic alkali, either in open pots or in vessels fitted with a condenser, at elevated temperatures under ordinary atmospheric pressure. At temperatures around 250° C. a vigorous reaction sets in with the evolution of hydrogen and octanol-2. The latter distills off together with water, leaving a hard, dense, stone-like mass, which is extremely difficult to stir and which, upon acidification, yields a mixture of liquid higher fatty acids and sebacic acid. The latter is obtained in yields varying from 10 to 25 parts per 100 parts of castor oil taken. By the use of stirring, yields as high as 40 parts per 100 parts of castor oil can be obtained.

The process at best is, however, unsatisfactory. The castor oil soap, which is first formed, sets to a rigid mass during the heating and prevents efficient stirring. Considerable local overheating occurs, resulting in charring and pyrogenic decomposition. This yields sebacic acid which is dark in color and contaminated with dark-colored impurities and oily by-products. During the reaction on a commercial scale large quantities of hydrogen are evolved, leading to danger of explosions and fires. Furthermore, the process has always heretofore been of such a character as to be applicable only to batch operation; that is to say, a batch of castor oil and alkali hydroxide are heated together until the reaction is complete and the reaction kettle is then emptied to receive a fresh batch of castor oil and alkali. Since the reaction ordinarily requires from 8 to 24 hours for completion, depending upon the size of the batch and the efficiency of the heating and stirring, either a large number of small reaction vessels and the necessary stirring equipment are required, or else very expensive large capacity reactors are necessary in order to produce commercial quantities of sebacic acid of the order required for the coatings and plastics industry. Due to the difficulties of stirring the reaction mass huge power-consuming scrapers and stirrers are required in order to prevent local overheating. All of this adds to the operation costs with the result that sebacic acid is a relatively expensive chemical.

One object of the present invention is to lower the cost of making sebacic acid by the use of a more efficient process according to which sebacic acid is obtained in higher yields and purity by a method in which the solidification of the castor oil soaps during the heating is prevented, thereby eliminating charring, local overheating and pyrogenic decomposition.

Another object of this invention is to eliminate the use of expensive, power-consuming stirring apparatus in the manufacture of sebacic acid by providing a process in which the reaction mixture remains a liquid throughout the heating operation.

Another object of this invention is to provide a process according to which sebacic acid of high purity and light color is obtained directly without any subsequent purification.

A further object is to provide a continuous process for manufacturing sebacic acid and octanol-2.

These and other objects set forth herein are accomplished by carrying out the reaction between the ricinoleic acid compound and the caustic alkali in an aqueous solution under conditions that prevent the escape of water vapor. The temperature of reaction is above 175° C., preferably between 240° C. and 325° C., so special means, such as carrying out the reaction under a superatmospheric pressure at least equal to the vapor tension of the mixture at the temperature used, is necessary. This condition is conveniently attained by heating the mixture in a closed system which prevents the escape of all vapors and gases until after the reaction is completed. If desired, however, the hydrogen liberated by the reaction may be separated as formed, provided precautions be taken to prevent the drying of the reaction mixture through escape of water vapor. Under these conditions the alkali metal soaps remain in aqueous solution throughout the heating period.

This process could not have been foreseen, since the alkali fusion method of the prior art is in reality an oxidation of the ricinoleic acid molecule by the action of molten alkali hydroxide, and it was extremely unlikely that an aqueous caustic alkali solution would behave as drastically as molten caustic on ricinoleic acid. Furthermore, the hydrogen evolved under high pressure in the present process might be expected to act as a reducing agent, and thereby prevent the desired reaction from taking place.

However, by this new process, sebacic acid is obtained in yields higher than any heretofore recorded. The sebacic acid is obtained as a snow-white solid in yields averaging about 47 parts per 100 parts of castor oil, representing a 20% increase in yield over prior processes.

The advantages of this process may be obtained in either a batch process or in a continuous process. The extremely difficult stirring of the old fusion process is eliminated. The desired reaction is obtained more completely and in a shorter time. Furthermore, all the products are obtained in better purity.

In a batch process, the mixture of castor oil or ricinoleic acid and aqueous alkali is added to an autoclave which may then be heated up and held at the desired temperature, or the autoclave may be maintained at reaction temperature and the charge pumped in. The product can be discharged by blowing out through a discharge pipe, utilizing the pressure in the autoclave, or it may be drained out at the bottom of the autoclave. In either case, the autoclave is most conveniently discharged hot because the reaction mass usually solidifies on cooling. The autoclave may be provided with a means of agitation, or it may not be The reaction may be satisfactorily carried out in an autoclave without agitation, and this greatly simplifies the construction and use of an autoclave.

Due to the fact that the reaction mixture remains in solution during the heating period, this process is particularly well adapted to large-scale use in a continuous manner in which a mixture of castor oil or ricinoleic acid and aqueous alkali is pumped through a suitable reaction vessel held at the desired temperature. The product may be discharged from the system through a suitable valve into a receiving tank. The receiving tank may conveniently contain water so that the reaction product is cooled and easily worked up by acidification to obtain the free sebacic acid. The hydrogen formed by the reaction is vented along with the discharge of the liquid and provision should be made for drawing off the hydrogen gas in a safe manner, suitably by good ventilation.

The reaction product in water may be steam-distilled to remove the octanol-2, or the octanol-2 may be removed later by steam distillation of the fatty acid component after the sebacic acid has been separated. In either case, the fatty acid material can be separated from the sebacic acid component by acidification to a pH of about 6.0, by means of a mineral acid such as sulfuric acid. This causes the separation of the fatty acids, together with any octanol-2 present to form an upper oily layer. The lower layer, which is the aqueous alkali metal sebacic solution, can be drawn off. Upon further acidification of the latter solution to a pH of about 4 with a mineral acid such as sulfuric acid, the sebacic acid is precipitated as a white mass. The latter is advantageously heated to boiling in the solution from which it was precipitated, and, on cooling, the sebacic acid crystallizes out in white waxy flakes which are easily filtered off, washed and dried. The sebacic acid obtained in this manner requires no further purification for most purposes.

The octanol-2 obtained by steam distillation is a colorless liquid and usually contains some methyl hexyl ketone and some moisture. It may be dried by a simple distillation.

We have found that the fatty acid by-product which is obtained in this process is of light color and bland odor, in contrast to the brown or black evil-smelling byproduct which is produced by the ordinary, known process. These acids contain the fatty acids other than ricinoleic acid in the original castor oil or in the commercial ricinoleic acid prepared from castor oil. Such acids amount to approximately 15% of the castor oil. The fatty acid by-product also contains whatever ricinoleic acid was unreacted. These fatty acids can be used for soap stock and for other purposes, and together with the octanol-2 constitute valuable by-products from the process.

In practicing this invention, we have found that considerable variation may be made in the factors controlling the reaction without affecting the course of the reaction, except that the pressure developed depends upon the other factors and upon the amount of free space in the reaction vessel.

The pressure used is determined principally by the pressure developed by water at the temperature used and by hydrogen gas formed during the reaction. At our preferred temperature of about 275° C., the pressure usually observed is 800 to 1200 lbs. gage. The particular pressure obtained is not important. It is not necessary to increase the pressure beyond that normally attained. The pressure obtained may be as high as 2000 or 3000 lbs. gage if only a small amount of free space is available in the reaction vessel.

The reaction begins at about 175° C. It is rapid at above about 240° C. and moderate at 220° C. We prefer an operating temperature of about 250° to 300° C., although higher temperatures can be used, namely as high as 350° C. Above 350° C. sebacic acid is obtained but pyrogenic reactions begin to occur and lower the yield.

The reaction is rapid at our preferred temperature range. Over 60% of the reaction may be completed in one hour. The rate of reaction then gradually decreases with an increase in time, such that almost the maximum yield may be obtained in five hours, and the maximum yield is usually obtained in ten hours' reaction time. The use of higher temperatures in general permits a shorter reaction time. The time of reaction is regulated simply in a batch process and may be controlled by regulating the rate of throughput in a continuous process.

It has been found advantageous to use sodium hydroxide as the caustic alkali, although other alkalies which give water-soluble salts of ricinoleic acid, such as potassium hydroxide, may be used, or the corresponding alkali metal carbonates or mixtures of any of these alkalies can be used. The quantity of alkali required is in excess of that required to saponify the castor oil or to form the soap of ricinoleic acid. It is advantageous to use not less than the minimum amount of alkali hydroxide required by the following equation:

$$CH_3(CH_2)_5-CH(OH)CH_2-CH=CH(CH_2)_7COOH+2NaOH \rightarrow$$
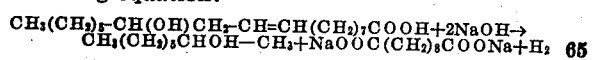

On a weight basis this requires approximately 8 parts of sodium hydroxide to 30 parts of ricinoleic acid. Since castor oil is principally the tri-ricinoleic glyceride, one mol of castor oil requires a correspondingly greater molecular amount of alkali metal hydroxide, namely not less than six equivalents. To obtain high yields of sebacic acid, it is advantageous to use more than the theoretical amounts indicated above. We prefer 1.5 to 2 times the theoretical amounts.

A still larger amount of alkali can be employed. However, there is no further advantage gained by doing so. A smaller quantity of caustic alkali than the theoretical can be used, say more than 1 and less than 2 mol equivalents, but the yield of sebacic acid is thereby decreased.

The amount of water used in making up the charging mixture can be varied considerably, although the best yields of sebacic acid are obtained when the amount of water is the minimum that can be employed and yet allow the reaction mixture to remain fluid and pumpable at reaction temperature. If less water than this is used, it becomes necessary to have agitation in the reaction vessel. If a great excess of water is employed, the yield of sebacic acid is decreased. We prefer to employ a ratio of water to ricinoleic acid compound of about 0.25 to 2 parts by weight of water to 1 part by weight of the castor oil or other ricinoleic acid compound used. This is equivalent to a molecular ratio of approximately from 4 to 33 mols of water to 1 mol of ricinoleic acid compound calculated as ricinoleic acid.

Various catalysts and contact agents may be employed in this reaction. Some such agents appear to give somewhat better yields of sebacic acid than are otherwise obtained, notably with hydrogenation-dehydrogenation catalysts. The reaction, however, does not depend upon catalysts and can be very satisfactorily carried out without employing any catalytic material. Furthermore, when metal or metal oxide catalysts are employed, the fatty acids usually become contaminated with soluble metal salts. Finely divided carbon has little effect on the reaction. Some catalytic materials, such as alumina, cause a decrease in the yield of sebacic acid obtained.

Other materials may be added to influence the reaction somewhat, although it is not necessary to start with any material other than alkali, water and ricinoleic compound. We have, however, found some materials which, when added to the reaction mixture, cause an improvement in the yield of sebacic acid obtainable. Among such materials the alcohols are particularly effective. While any of the alcohols may be used, we prefer to use octanol-2 because it is produced in the process and involves no additional recovery problems.

In order to illustrate this invention still more clearly, the following examples are given:

Example 1

156 parts by weight of castor oil was added to a solution of 79 parts sodium hydroxide in 100 parts of water. The material was heated in an agitated autoclave for ten hours at 275° C. The pressure developed was 1200 lbs. per square inch. The reaction product was discharged into about four times its weight of water and heated to 95° C. with stirring. Sulfuric acid was added until the solution was just acid to Brom Thymol Blue. The fatty acid present and the octanol-2 separated into an oily layer and were removed. The aqueous solution was almost colorless and contained the sebacic acid which was set free by further acidification with sulfuric acid. The sebacic acid came down as a pure white material. The solution was cooled from 95° C. to about 10° C. and the sebacic acid was filtered off, washed with cold water to remove excess sulfuric acid, and then dried at 80° C. The yield of sebacic so obtained was 47.9% by weight, which amounts to 87.3% of the theoretical. The sebacic acid so obtained was a white, flaky material having a melting point of 129°–130° C. The capryl alcohol (octanol-2) was recovered from the fatty acid by-product by steam distillation. There was obtained a 23.4% yield of technical capryl alcohol which, by further analysis, contained 72% octanol-2 and 28% methyl hexyl ketone. This material was a colorless liquid. The fatty acid residue was a light-brown-colored liquid having a mild odor characteristic of the higher fatty acids. The fatty acid residue amounted to 20.5% by weight of the castor oil used, and had a saponification number of 124.5 and an acid number of 121.

(a) The process carried out as described in detail above, except that the reaction time was only one hour, gave a yield of sebacic acid of 35.8% by weight.

(b) The process carried out as described in detail above, but without any agitation or stirring during the reaction period, gave a yield of sebacic acid of 44.6% by weight.

Example 2

156 parts of ricinoleic acid was added to a solution of 79 g. of sodium hydroxide in 79 parts of water and held at 275° C. for 10 hours in an autoclave. The pressure observed at the end of this time was 1500 lbs. gage. The reaction product was added to about three times its weight of water, and then subjected to steam distillation, which removed the capryl alcohol. The material was then just acidified to Brom Thymol Blue indicator with sulfuric acid, which set free the fatty acid as an oil layer. The aqueous sodium acid sebacate solution was drained off and then further acidified to set free the sebacic acid. Before filtering, the material was heated to 95° C. and then allowed to cool to 20° C. It was then filtered, washed and dried as usual. The yield of sebacic acid obtained was 49.8% by weight.

(a) When potassium hydroxide was substituted in molecularly equivalent amounts for the sodium hydroxide used in the above example, the yield of sebacic acid obtained was 39.8% by weight.

(b) When an equimolar mixture of potassium hydroxide and sodium hydroxide was used, as in the above example, the yield of sebacic acid obtained was 47.6% by weight.

(c) When the process was carried out as in the above example, except that the time of reaction was 2.5 hours and the reaction temperature was 325° C., the yield of sebacic acid obtained was 46.6% by weight.

(d) When an added alcohol was employed in the process, for example, when a weight of capryl alcohol equal to one-third the weight of ricinoleic acid is added and the reaction carried out as in the above example described in detail, the yield of sebacic acid obtained was 51.8% by weight of the ricinoleic acid taken.

(e) When a hydrogenating-dehydrogenation catalyst was employed, for example, when 5 parts of finely divided copper-chromium-barium oxide catalyst was added to the reacting charge and the reaction carried out as described in detail in the above example, the yield of sebacic acid obtained was 51.8% by weight.

Example 3

The process was carried out in a continuous manner by adding castor oil to 35% aqueous sodium hydroxide at such a rate that there was approximately 3.5 equivalents of alkali per each equivalent of ricinoleic acid content. This mixture was pumped into a suitable pressure-resisting reaction vessel at such a rate that the reaction time was approximately 6 hours. The reaction vessel was maintained at 285°–300° C. Reaction product was discharged through a valve at the same rate as of input, and at such a rate as to maintain the pressure in the reaction vessel at approximately 1200 lbs. per square inch. The product was discharged directly into water in a chamber fitted with condensation traps over the top and with a hood over the complete discharge equipment leading to a ventilating fan to remove hydrogen and any other gases which were formed. From time to time the material collected from the discharge was withdrawn and worked up in batches as described in Example 2 to recover the capryl alcohol, fatty acid and sebacic acid. The products obtained were similar in quality and quantity to those obtained in the batch process. The yield of sebacic acid obtained was approximately 46% by weight.

Ricinoleic acid was used in a continuous manner as above with similar results.

In the foregoing examples, given to illustrate the invention, ricinoleic acid and castor oil, the most available materials, have been used as representative, but it is apparent that other functional derivatives of ricinoleic acid could be used in equivalent amounts. Any ricinoleic acid derivative which, when treated with alkali, forms a ricinoleic acid soap may be used as starting material in our process.

Modifications of the process such as, for instance, the initial conversion of the ricinoleic acid compound to a ricinoleic acid soap and the employment of the soap as starting material in the hereindisclosed process will occur to those skilled in the art. It is intended that such modifications as do not depart from the principle of this invention, i. e. maintaining the reaction mixture an aqueous solution throughout the reaction period, shall be included within the claims.

We claim:

1. A process of manufacturing sebacic acid which comprises heating a functional derivative of ricinoleic acid with a member of the group consisting of alkali metal hydroxides and alkali metal carbonates in aqueous solution at a temperature above 175° C. and under superatmospheric pressure at least equal to the vapor pressure of the reaction mixture at the temperature used.

2. A process of manufacturing sebacic acid which comprises heating a functional derivative of ricinoleic acid with sodium hydroxide in aqueous solution at a temperature between 250° C. and 300° C. in a closed vessel.

3. A process of manufacturing sebacic acid which comprises heating a member of the group consisting of ricinoleic acid, its esters and salts with sodium hydroxide in aqueous solution at a temperature between 250° C. and 300° C. in a closed vessel.

4. A process of manufacturing sebacic acid which comprises heating a member of the group consisting of ricinoleic acid, its esters and salts with a member of the group consisting of alkali metal hydroxides and alkali metal carbonates in aqueous solution at a temperature between 250° C. and 300° C. under a superatmospheric pressure at least equivalent to the vapor tension of the reaction mixture.

5. A process of manufacturing sebacic acid which comprises heating castor oil with a member of the group consisting of alkali metal hydroxides and alkali metal carbonates in aqueous solution at a temperature between 250° C. and 300° C. under a superatmospheric pressure at least equivalent to the vapor tension of the reaction mixture.

6. A process of manufacturing sebacic acid which comprises heating ricinoleic acid with a member of the group consisting of alkali metal hydroxides and alkali metal carbonates in aqueous solution at a temperature between 250° C. and 300° C. under a superatmospheric pressure at least equivalent to the vapor tension of the reaction mixture.

7. A process of manufacturing sebacic acid which comprises mixing approximately 30 parts by weight of a functional derivative of ricinoleic acid with from 7 to 60 parts of water and an amount of a member of the group consisting of alkali metal hydroxides and alkali metal carbonates equivalent to from 8 to 16 parts of sodium hydroxide, heating said mixture at a temperature of from 175° C. to 350° C. under conditions that prevent the escape of water vapor, acidifying the reaction product to a pH of approximately 6 to separate liquid fatty acid by-products and octanol-2, removing said by-products from the water layer, and acidifying the water layer to a pH below 6 to precipitate the sebacic acid.

8. A process of manufacturing sebacic acid which comprises mixing approximately 30 parts by weight of a member of the group consisting of ricinoleic acid, its esters and salts with from 7 to 60 parts of water and an amount of an alkali metal hydroxide equivalent to from 8 to 16 parts of sodium hydroxide, heating said mixture in a closed vessel at a temperature of from 175° C. to 350° C. under conditions that prevent the escape of water vapor, acidifying the reaction product to a pH of approximately 6 to separate liquid fatty acid by-products and octanol-2, removing said by-products from the water layer, and acidifying the water layer to a pH below 6 to precipitate the sebacic acid.

9. A process of manufacturing sebacic acid which comprises mixing approximately 30 parts by weight of castor oil with from 8 to 16 parts of sodium hydroxide and from 7 to 60 parts of water, heating said mixture at a temperature of from 175° C. to 350° C. under a superatmospheric pressure at least equivalent to the vapor tension of the reaction mixture, acidifying the reaction mixture to a pH of approximately 6 to separate liquid fatty acid by-products and octanol-2, removing said by-products from the water layer, and acidifying the water layer to a pH below 6 to precipitate the sebacic acid.

10. A process of manufacturing sebacic acid which comprises mixing approximately 30 parts by weight of ricinoleic acid with from 8 to 16 parts of sodium hydroxide and from 7 to 60 parts of water, heating said mixture at a temperature of from 175° C. to 350° C. under a superatmospheric pressure at least equivalent to the vapor tension of the reaction mixture, acidifying the reaction mixture to a pH of approximately 6 to separate liquid fatty acid by-products and octanol-2, removing said by-products from the water layer, and acidifying the water layer to a pH below 6 to precipitate the sebacic acid.

11. A process of manufacturing sebacic acid which comprises mixing approximately 30 parts by weight of castor oil with from 8 to 16 parts of sodium hydroxide and from 7 to 60 parts of water, heating said mixture at approximately 275° C. under a pressure above 800 lbs. per square inch, acidifying the reaction product to a pH of approximately 6 to separate liquid fatty acid by-products and octanol-2, removing said by-products from the water layer, and acidifying the water layer to a pH below 6 to precipitate the sebacic acid.

12. A process of manufacturing sebacic acid which comprises mixing approximately 30 parts by weight of ricinoleic acid with from 8 to 16 parts of sodium hydroxide and from 7 to 60 parts of water, heating said mixture at approximately 275° C. under a pressure above 800 lbs. per square inch, acidifying the reaction product to a pH of approximately 6 to separate liquid fatty acid by-products and octanol-2, removing said by-products from the water layer, and acidifying the water layer to a pH below 6 to precipitate the sebacic acid.

13. A continuous process of manufacturing sebacic acid which comprises mixing approximately 30 parts by weight of a functional derivative of ricinoleic acid with from 7 to 60 parts of water and an amount of a member of the group consisting of alkali metal hydroxides and alkali metal carbonates equivalent to from 8 to 16 parts of sodium hydroxide, and continuously passing the mixture through a closed reaction zone in which it is maintained at a temperature between 175° C. and 350° C.

14. A continuous process of manufacturing sebacic acid which comprises mixing approximately 30 parts by weight of a member of the group consisting of ricinoleic acid, its esters and salts with from 7 to 60 parts of water and an amount of an alkali metal hydroxide equivalent to from 8 to 16 parts of sodium hydroxide, and continuously passing the mixture through a closed reaction zone in which it is maintained at a temperature between 175° C. and 350° C.

15. A continuous process of manufacturing sebacic acid which comprises mixing approximately 30 parts by weight of castor oil with from 8 to 16 parts of sodium hydroxide and from 7 to 60 parts of water and continuously passing the mixture through a closed reaction zone in which it is maintained at a temperature between 175° C. and 350° C.

16. A continuous process of manufacturing sebacic acid which comprises mixing approximately 30 parts by weight of ricinoleic acid with from 8 to 16 parts of sodium hydroxide and from 7 to 60 parts of water and continuously passing the mixture through a closed reaction zone in which it is maintained at a temperature between 175° C. and 350° C.

HERMAN A. BRUSON.
LLOYD W. COVERT.